(12) United States Patent
Bu et al.

(10) Patent No.: US 9,581,847 B2
(45) Date of Patent: Feb. 28, 2017

(54) DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhanchang Bu, Beijing (CN); Kun Lu, Beijing (CN)

(73) Assignees: BOE Technology Group Co., Ltd. (CN); Beijing BOE Display Technology Co., Ltd. (CN)

( * ) Notice: Subject to any disclaimer, the term of this patent is extended or adjusted under 35 U.S.C. 154(b) by 136 days.

(21) Appl. No.: 14/498,545

(22) Filed: Sep. 26, 2014

(65) Prior Publication Data
US 2015/0346540 A1 Dec. 3, 2015

(30) Foreign Application Priority Data

May 27, 2014 (CN) ..................... 2014 2 0275682 U

(51) Int. Cl.
*G02F 1/1333* (2006.01)
*G02F 1/1335* (2006.01)

(52) U.S. Cl.
CPC ...... *G02F 1/133308* (2013.01); *G02F 1/1336* (2013.01); *G02F 2001/13332* (2013.01); *G02F 2001/133314* (2013.01); *G02F 2001/133317* (2013.01)

(58) Field of Classification Search
CPC ............... G02F 1/133308; G02F 2001/133314
See application file for complete search history.

(56) References Cited

U.S. PATENT DOCUMENTS

| | | | | |
|---|---|---|---|---|
| 8,944,668 B2* | 2/2015 | Kuromizu | ............ | G02B 6/0088 349/58 |
| 2012/0162567 A1* | 6/2012 | Shimomichi | ..... | G02F 1/133308 349/58 |
| 2013/0258237 A1* | 10/2013 | Zhang | ..................... | B29C 45/00 349/60 |
| 2014/0347567 A1* | 11/2014 | Ito | ............................. | H04N 5/64 348/791 |
| 2015/0055026 A1* | 2/2015 | Ikuta | ......................... | H04N 5/64 348/791 |
| 2015/0146109 A1* | 5/2015 | Kasai | .................. | G02B 6/0088 348/790 |

\* cited by examiner

*Primary Examiner* — Kendrick Hsu
(74) *Attorney, Agent, or Firm* — Baker Hostetler LLP

(57) ABSTRACT

The present disclosure provides a display device including a rubber frame, a liquid crystal panel, a backplane, and a front frame which is connected with the backplane. The rubber frame is located between the backplane and the front frame. A periphery of the liquid crystal panel is retained between a support surface of the rubber frame and the front frame. The rubber frame is provided with a through-hole, a central axis of which is perpendicular to a plane where a light emitting surface of the liquid crystal panel is located. The backplane is provided with a slot-hole. The center axis of the through-hole passes through the slot-hole. The display device further includes a screw corresponding to the through-hole. The screw extends into the through-hole and is movable toward the front frame along the center axis of the through-hole relative to the rubber frame.

12 Claims, 2 Drawing Sheets

DISPLAY DEVICE

CROSS-REFERENCE TO RELATED APPLICATION

This application claims priority to Chinese Patent Application No. 201420275682.2 filed on May 27, 2014, the disclosures of which are incorporated in their entirety by reference herein.

TECHNICAL FIELD

The present disclosure relates to the technical field of display technology, and more particularly to a display device.

BACKGROUND

A liquid crystal panel itself does not emit light, thus, a backlight is required to be placed behind the liquid crystal panel. The liquid crystal panel and the backlight are fixed by a mechanical structure. In a normally white liquid crystal panel, when an electric field is applied on liquid crystal molecules, the liquid crystal panel may block the spread of light, so that a totally black screen is displayed. In a normally black liquid crystal panel, when no electric field is applied on the liquid crystal molecules, the liquid crystal panel may block the spread of light, so that the totally black screen is displayed.

However, under normal circumstances, especially in an advanced super dimension switch (ADS) mode liquid crystal panel, the liquid crystal panel is not able to completely block the light. Particularly at a mechanical engagement structure on edges of the panel, since a front frame on the edges of the liquid crystal panel is usually manufactured by die stamping which is not a precision machining, thus, it is difficult to ensure good flatness and small dimensional tolerance. Further, even using a front frame with good flatness, the front frame may be deformed during a process of assembling a liquid crystal display module, resulting in that a gap between the front frame and the liquid crystal panel becomes smaller. Therefore, compressive stress against the liquid crystal panel caused by a deformed portion of the front frame becomes larger, thereby significantly weakening effects of blocking the light by the liquid crystal panel, and a light-leakage phenomenon appears in the totally black screen.

SUMMARY

The present disclosure provides a display device, in which the phenomenon of light-leakage defect in the black screen may be improved, thereby improving product yield.

To achieve the above object, technical solutions provided in the present disclosure are as follows.

A display device includes rubber frame, a liquid crystal panel, a backplane, and a front frame which is connected with the backplane; wherein the rubber frame is located between the backplane and the front frame; the rubber frame has a support surface which faces towards the front frame and is used for supporting a periphery of the liquid crystal panel; the periphery of the liquid crystal panel is retained between the support surface and the front frame; the rubber frame is provided with at least one through-hole, a central axis of which is perpendicular to a plane where a light emitting surface of the liquid crystal panel is located; the backplane is provided with at least one slot-hole; the center axis of the through-hole passes through the slot-hole; the display device further includes a screw corresponding to the through-hole; the screw extends into the through-hole and is able to move toward the front frame along the center axis of the through-hole relative to the rubber frame.

In the above-described display device, the rubber frame is provided with the through-hole, the central axis of which is perpendicular to the plane where the light emitting of the liquid crystal panel is located. The backplane is provided with the slot-hole. The display device further includes the screw corresponding to the through-hole. The screw extends into the through-hole. The screw may be adjusted outside the backplane, to cause the screw to move toward the front frame relative to the rubber frame along the center axis of the corresponding through-hole.

When the front frame is deformed and the compressive stress applied by the deformed portion of the front frame on the liquid crystal panel is too large, it is possible to adjust, outside the backplane, the screw which is corresponding to the deformed portion of the front frame, so that the screw moves toward the front frame along the center axis of the through-hole relative to the rubber frame. The deformed portion of the front frame is lifted up by the screw. A gap between the deformed portion of the front frame and the liquid crystal panel is increased, thus, the compressive stress applied on the liquid crystal panel by the deformed portion of the front frame is reduced, so that when displaying a totally black screen, the liquid crystal panel may better block the spread of light, thus the defect of light-leakage in the black screen is improved.

Therefore, the defect of light-leakage in the Hack screen in the above display device is improved and the product yield quality is improved.

In one embodiment, the rubber frame is provided with a plurality of through-holes.

In one embodiment, the through-hole provided in the rubber frame is a screwed hole, the screw treaded engages with the screwed hole.

In one embodiment, the slot-hole provided in the backplane has internal threads; the screw threaded engages with the slot-hole.

In one embodiment, the slot-hole is a waist-shaped hole. Each waist-shaped hole corresponds to at least two through-holes.

In one embodiment, the slot-hole is a circular hole. Each circular hole corresponds to one through-hole.

In one embodiment, the through-holes provided in the rubber frame are uniformly distributed along a frame of the rubber frame.

In one embodiment, the through-holes are distributed in a frame of the rubber frame where a light strip is provided, each of the through-holes is located in a gap between two adjacent light-emitting diodes on the light strip.

DETAILED DESCRIPTION

The technical solution according to the embodiments of the present disclosure will be clearly and completely described below, in conjunction with the accompany drawings. Obviously, the described embodiments are merely parts of embodiments of the present disclosure, but not all the embodiments. Based on the embodiments in the present disclosure, all the other embodiments obtained without creative works by those of ordinary skill in the art, will fall within the protection scope of the present disclosure.

Figure 1A:
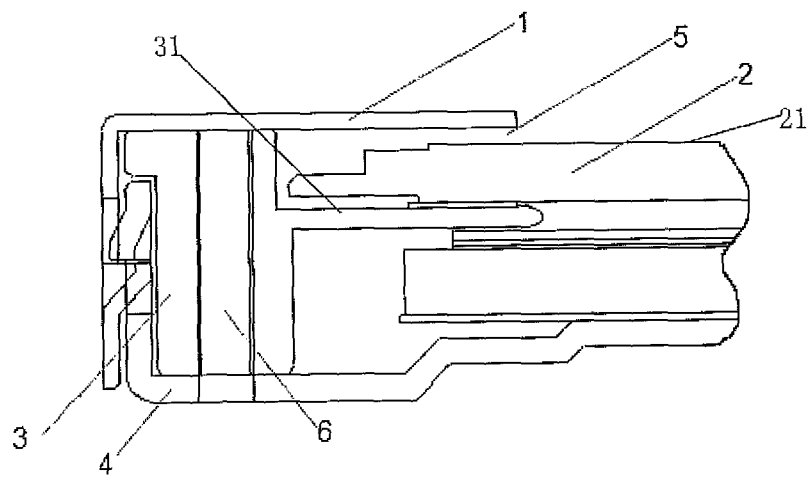
FIG. 1a is a schematic cross-section view of a display device according to one embodiment of the present disclosure, showing a through-hole arranged in a rubber frame of the display device.
Figure 1B:
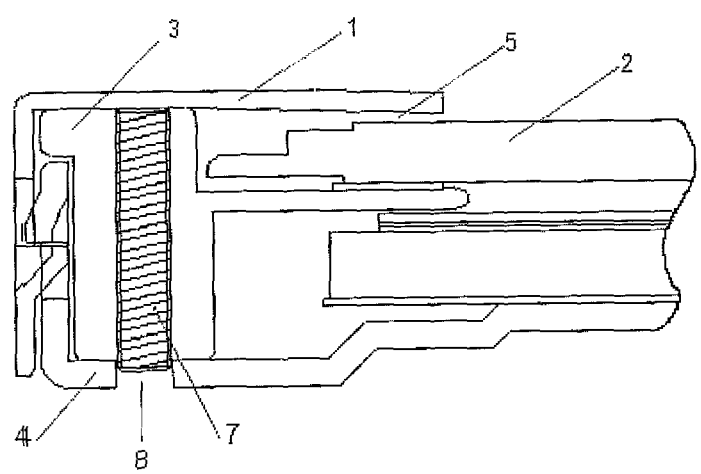
FIG. 1b is a schematic cross-section view of the display device according to one embodiment of the present disclosure, when a front frame of the display device is deformed.
Figure 1C:
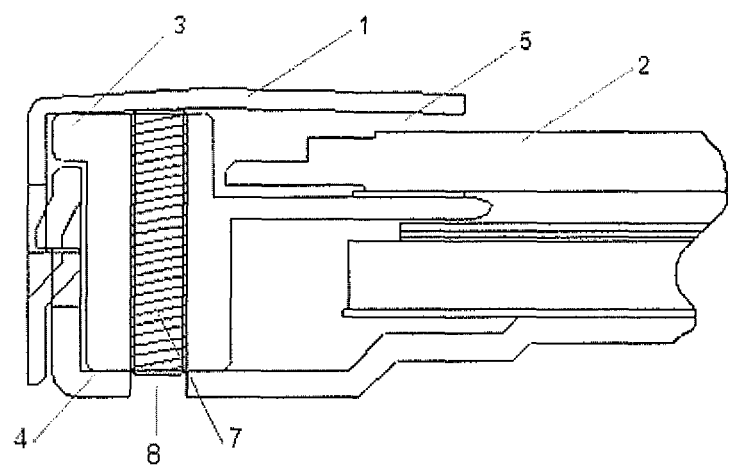
FIG. 1c is a schematic cross-section view of the display device according to one embodiment of the present disclosure, when a deformed portion of the front frame is adjusted by a screw.

Referring to FIGS. 1a to 1c, FIG. 1a is a schematic cross-section view of a display device according to one embodiment of the present disclosure, showing a through-hole arranged in a rubber frame of the display device; FIG. 1b is a schematic cross-section view of the display device according to one embodiment of the present disclosure, when a front frame of the display device is deformed. FIG. 1c is a schematic cross-section view of the display device according to one embodiment of the present disclosure, when a deformed portion of the front frame is adjusted by a screw.

As shown in FIGS. 1a and 1b, a display device provided by one embodiment of the present disclosure includes a rubber frame 3, a liquid crystal panel 2, a backplane 4, and a front frame 1 which is connected with the backplane 4. The rubber frame 3 is located between the backplane 4 and the front frame 1. The rubber frame 3 has a support surface 31 which faces towards the front frame 1 and is used for supporting a periphery of the liquid crystal panel 2. The periphery of the liquid crystal panel 2 is retained between the support surface 31 and the front frame 1. The rubber frame 3 is provided with at least one through-hole 6. A central axis of the through-hole 6 is perpendicular to a plane where a light emitting surface 21 of the liquid crystal panel 2 is located. The backplane 4 is provided with at least one slot-hole 8. The center axis of each of the at least one through-hole 6 passes through one corresponding slot-hole 8.

The display device also includes at least one screw 7. In one embodiment, the at least one screw 7 is corresponding to the at least one through-hole 6 in a one-to-one manner. The screw 7 extends into the through-hole 6, and is able to move toward the front frame 1 along the center axis of the through-hole 6 relative to the rubber frame 3.

In the above-described display device, the rubber frame 3 is provided with the through-hole 6, the central axis of which is perpendicular to the plane where the light emitting surface 21 of the liquid crystal panel 2 is located. The backplane 4 is provided with the slot-hole 8. The center axis of each of the at least one through-hole 6 passes through the corresponding slot-hole 8. The display device further includes the screw 7, and the screw 7 is corresponding to the through-hole 6. The screw 7 extends into the through-hole 6. The screw 7 may be adjusted outside the backplane 4, to cause the screw 7 to move toward the front frame 1 relative to the rubber frame 3 along the center axis of the corresponding through-hole 6.

As shown in FIG. 1b, when the front frame 1 is deformed and compressive stress applied by a deformed portion of the front frame 1 on the liquid crystal panel 2 is too large, it is possible to adjust, outside the backplane 4, the screw 7 which is opposite to the deformed portion of the front frame 1. As shown in FIG. 1e, the screw 7 moves toward the front frame 1 along the center axis of the through-hole 6, relative to the rubber frame 3, until the deformed portion of the front frame 1 is lifted up by the screw 7. As a result, a gap 5 between the deformed portion of the front frame 1 and the liquid crystal panel 2 is increased, and thus the compressive stress applied by the deformed portion of the front frame 1 on the liquid crystal panel 2 is reduced, so that when displaying a totally black screen, the liquid crystal panel 2 may better block the spread of light, thereby improving the defect of light-leakage defect in the totally black screen.

Therefore, the defect of light-leakage in the black screen of the above display device may be improved and the product yield may be improved.

In one embodiment, the rubber frame 3 is provided with a plurality of through-holes 6.

In one embodiment, the movement of the screw 7 toward the front frame 1 along the center axis of the through-hole 6 relative to the rubber frame 3, mentioned in the above embodiment, specifically may be achieved through a variety of ways.

A first way is that, in one embodiment, the through-hole 6 provided in the rubber frame 3 is a screwed hole, and the screw 7 threaded engages with the screwed hole. Rotating the screw 7 in the screwed hole causes the screw 7 to move toward the front frame 1 along the center axis of the screwed hole.

A second way is that, in one embodiment, the slot-hole 8 provided in the backplane 4 has internal threads, and the screw 7 threaded engages with the slot-hole 8. The screw 7 may be adjusted outside the backplane 4. Rotating the screw 7 causes the screw 7 to extend into the through-hole 6 through the slot-hole 8, and move toward the front frame 1 along the center axis of the through-hole 6, relative to the rubber frame 3.

In one embodiment, on the basis of the first way or the second way described above, the slot-hole 8 is a waist-shaped hole. The center axis of each of the through-hole 6 passes through the waist-shaped hole. Each waist-shaped hole corresponds to at least two through-holes 6.

In one embodiment, on the basis of the first way or the second way described above, the slot-hole 8 is a circular hole. The center axis of each through-hole 6 passes through the circular hole. Each circular hole corresponds to one through-hole 6.

Figure 2:
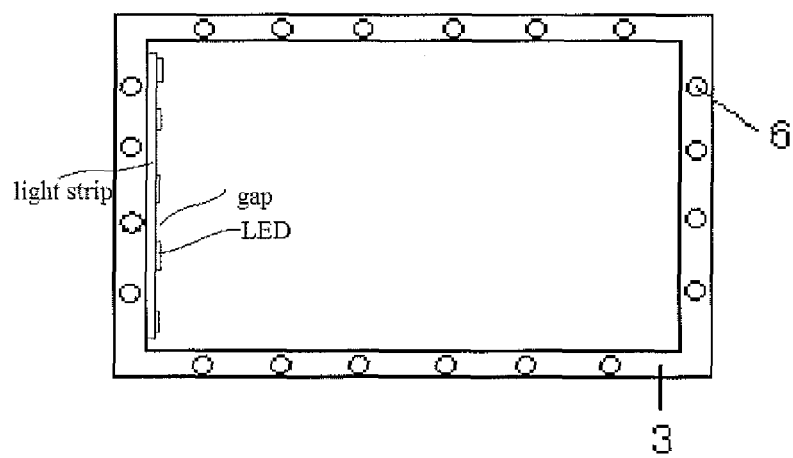
FIG. 2 is a schematic diagram showing distribution locations of a plurality of through-holes in a rubber frame of a display device according to one embodiment of the present disclosure.

On the basis of the respective embodiments described above, in one embodiment, as shown in FIG. 2, the through-holes 6 provided in the rubber frame 3 are uniformly distributed along a frame of the rubber frame 3. Each deformed portion of the front frame 1 may be adjusted by the screw 7 in the through-hole 6 corresponding to the each deformed portion of the front frame 1.

On the basis of the respective embodiments described above, in one embodiment, when the through-holes 6 are distributed in a frame of the rubber frame where a light strip are provided, each of the through-holes 6 is located in a gap between two adjacent light-emitting diodes on the strip, so that the presence of the through-holes 6 will not affect periphery arrangements of the liquid crystal panel 2.

Obviously, those skilled in the art can carry out various modifications and variations to embodiments of the present disclosure, without departing from the spirit and scope of the present disclosure. Thus, if such modifications and variations of the present disclosure fall within the scope of the claims of the present disclosure and the equivalent technologies thereof, the present disclosure is also intended to comprise these modifications and variations.

What is claimed is:

1. A display device comprising:
   a rubber frame, a liquid crystal panel, a backplane and a front frame which is connected with the backplane;
   wherein the rubber frame is located between the backplane and the front frame; the rubber frame has a support surface which faces towards the front frame and is used for supporting a periphery of the liquid crystal panel;
   the periphery of the liquid crystal panel is retained between the support surface and the front frame; the rubber frame is provided with at least one through-hole; a central axis of the through hole is perpendicular to a plane where a light emitting surface of the liquid crystal panel is located; the backplane is provided with at least one slot-hole; the center axis of the through-hole passes through the slot-hole;
   the display device further comprises at least one screw corresponding to the through-hole; the screw extends into the through-hole, and is able to move toward the front frame along the center axis of the through-hole relative to the rubber frame;
   wherein the screw applies a force on the front frame in a direction pushing the front frame away from the liquid crystal panel;
   wherein the rubber frame is provided with a plurality of through-holes;
   wherein the through-holes are distributed in a frame of the rubber frame where a light strip is provided on, each of the through-holes is located in a gap between two adjacent light-emitting diodes on the light strip.

2. The display device according to claim 1, wherein each of the through-holes is a screwed hole and the screw threads engage with the screwed hole.

3. The display device according to claim 2, wherein the slot-hole provided in the backplane is a waist-shaped hole, and each waist-shaped hole corresponds to at least two of the through-holes.

4. The display device according to claim 2, wherein the slot-hole provided in the backplane is a circular hole and each circular hole corresponds to one of the through-holes.

5. The display device according to claim 2, wherein the through-holes provided in the rubber frame are uniformly distributed along the frame of the rubber frame.

6. The display device according to claim 1, wherein the slot-hole provided in the backplane has internal threads, and the screw threads engage with the slot-hole.

7. The display device according to claim 6, wherein the slot-hole provided in the backplane is a waist-shaped hole, and each waist-shaped hole corresponds to at least two of the through-holes.

8. The display device according to claim 6, wherein the slot-hole provided in the backplane is a circular hole and each circular hole corresponds to one of the through-holes.

9. The display device according to claim 6, wherein the through-holes provided in the rubber frame are uniformly distributed along the frame of the rubber frame.

10. The display device according to claim 1, wherein the slot-hole provided in the backplane is a waist-shaped hole, and each waist-shaped hole corresponds to at least two of the through-holes.

11. The display device according to claim 1, wherein the slot-hole provided in the backplane is a circular hole and each circular hole corresponds to one of the through-holes.

12. The display device according to claim 1, wherein the through-holes provided in the rubber frame are uniformly distributed along the frame of the rubber frame.

* * * * *